(12) United States Patent
Wang

(10) Patent No.: US 7,823,738 B2
(45) Date of Patent: Nov. 2, 2010

(54) DETACHABLE BAMBOO MATERIAL-BASED STORAGE CONTAINER

(76) Inventor: Wen-Tsan Wang, 6F., No. 300, Jui Kuang Road, Taipei (TW)

( * ) Notice: Subject to any disclaimer, the term of this patent is extended or adjusted under 35 U.S.C. 154(b) by 252 days.

(21) Appl. No.: 12/241,047

(22) Filed: Sep. 30, 2008

(65) Prior Publication Data

US 2010/0078430 A1 Apr. 1, 2010

(51) Int. Cl.
B65D 6/24 (2006.01)
B65D 6/36 (2006.01)
B65D 6/00 (2006.01)

(52) U.S. Cl. ............... 220/4.28; 220/4.33; 220/666; 217/12 R; 217/13

(58) Field of Classification Search ............ 217/12 R, 217/13; 220/4.28, 4.33, 666
See application file for complete search history.

(56) References Cited

U.S. PATENT DOCUMENTS

| | | | | |
|---|---|---|---|---|
| 1,705,003 | A * | 3/1929 | Crosley | 217/43 R |
| 2,543,157 | A * | 2/1951 | Ellis | 217/122 |
| 3,796,340 | A * | 3/1974 | Piggott | 217/36 |
| 3,809,278 | A * | 5/1974 | Csumrik | 220/4.33 |
| 3,989,157 | A * | 11/1976 | Veenema | 220/4.28 |
| 5,230,435 | A * | 7/1993 | Mo | 220/7 |
| 5,743,421 | A * | 4/1998 | Gonzalez et al. | 220/4.28 |
| 5,823,374 | A * | 10/1998 | Wu | 217/51 |
| 6,076,690 | A * | 6/2000 | Hemmerly | 217/43 R |
| 6,170,686 | B1 * | 1/2001 | Flores | 220/4.33 |
| 6,230,915 | B1 * | 5/2001 | Liu | 220/6 |
| 6,419,103 | B1 * | 7/2002 | Wang | 220/4.33 |
| 6,601,723 | B1 * | 8/2003 | Ziglar | 220/4.34 |
| 6,794,054 | B2 * | 9/2004 | Wang | 428/535 |
| 7,155,865 | B2 * | 1/2007 | Rosenberg | 52/79.9 |
| 2004/0108303 | A1 * | 6/2004 | Wang | 217/122 |
| 2004/0140239 | A1 * | 7/2004 | Wang | 206/509 |
| 2006/0289390 | A1 * | 12/2006 | Wang | 217/122 |
| 2007/0166502 | A1 * | 7/2007 | Wang | 428/55 |
| 2008/0115702 | A1 * | 5/2008 | Wang | 108/161 |
| 2008/0135549 | A1 * | 6/2008 | Wang | 220/9.2 |
| 2008/0168931 | A1 * | 7/2008 | Wang | 108/157.1 |
| 2008/0290098 | A1 * | 11/2008 | Wang | 220/660 |
| 2009/0084797 | A1 * | 4/2009 | Wang | 220/660 |
| 2009/0184115 | A1 * | 7/2009 | Wang | 220/4.26 |
| 2009/0217619 | A1 * | 9/2009 | Wang | 52/848 |
| 2009/0232593 | A1 * | 9/2009 | Wang | 403/341 |
| 2009/0250141 | A1 * | 10/2009 | Wang | 144/333 |
| 2010/0071295 | A1 * | 3/2010 | Wang | 52/578 |

* cited by examiner

*Primary Examiner*—Anthony Stashick
*Assistant Examiner*—Ned A Walker
(74) *Attorney, Agent, or Firm*—Leong C. Lei

(57) ABSTRACT

A detachable bamboo material-based storage container includes two side panels each having a substantially rectangular open frame made of bamboo and multiple bamboo slats transversely mounted in the rectangular open frame, a bottom panel detachably coupled between the two side panels by means of a tenon-and-mortise joint, a ⊓-shaped bamboo frame bar inserted through one side panel and forced into engagement with the other side panel and used as a handle of the storage container, multiple bamboo rod members detachably connected between the two side panels by means of a plug joint, and pins bilaterally vertically inserted through respective vertical through holes on the bamboo rod members and the ⊓-shaped bamboo frame bar and fitted into respective pinholes on the bottom panel.

2 Claims, 7 Drawing Sheets

DETACHABLE BAMBOO MATERIAL-BASED STORAGE CONTAINER

BACKGROUND OF THE INVENTION (a) Technical Field of the Invention

The present invention relates to storage containers and specifically, to a detachable bamboo material-based storage container.

(b) Description of the Prior Art

Wood, plastics, and many other materials are selectively used for making display racks, storage racks or storage containers. In order to show an antique sense of beauty, bamboo or wood material is the best choice for making storage racks and storage containers. Conventionally, bamboo strips are fastened together by means of a weaving technique to construct a bamboo panel, and then a number of bamboo panels are mounted with frame bars and fixed in place by fastening members to construct storage racks or storage containers. A storage container of this design is not suitable for do-it-yourself. When a storage container of this design is constructed, it is not detachable.

SUMMARY OF THE INVENTION

The primary purpose of the present invention is to provide a detachable bamboo material-based storage container, which is a do-it-yourself design, allowing the consumers to assemble and disassemble the storage container by themselves without the aid of paid professionals.

To achieve this and other objects of the present invention, the detachable bamboo material-based storage container is comprised of a first side panel, a second side panel, a bottom panel, a ⊓-shaped bamboo frame bar, a plurality of bamboo rod members and a plurality of pins:

The first side panel comprises a substantially rectangular open frame made of bamboo, at least one bamboo slat transversely mounted in the rectangular open frame of the first side panel, a horizontal coupling groove formed on one side of a bottom rail of the rectangular open frame of the first side panel, a plurality of plugholes bilaterally and symmetrically formed on an inner side of the rectangular open frame of the first side panel, two mortises respectively formed on the inner side of the first side panel, and two outer bamboo frame bar positioning grooves formed on the rectangular open frame of the first side panel.

The second side panel comprises a substantially rectangular open frame made of bamboo, at least one bamboo slat transversely mounted in the rectangular open frame of the second side panel, a horizontal coupling groove formed on one side of a bottom rail of the rectangular open frame of the second side panel, a plurality of plugholes bilaterally and symmetrically formed on an inner side of the rectangular open frame of the second side panel, two mortises respectively formed on the inner side of the second side panel, and two outer bamboo frame bar positioning grooves formed on the rectangular open frame of the second side panel.

The bottom panel is coupled to the horizontal coupling groove of the bottom rails of the first side panel and the horizontal coupling groove of the bottom rails of the second side panel, comprising two side bars respectively arranged on two opposite long sides thereof and a tenon respectively extended from each of two distal ends of the side bars and respectively engaging into the mortises of the first side panel and the mortises of the second side panel, and at least one pinhole on each side bar.

The ⊓-shaped bamboo frame bar comprises two longitudinal frame bar portions respectively inserted through the outer bamboo frame bar positioning grooves formed on the rectangular open frame of the first side panel, a transverse frame bar portion connected between one end of each of the two longitudinal frame bar portions, two retaining tips respectively extending from a distal end of each longitudinal frame bar portion remote from the transverse frame bar portion and respectively forced into engagement with the inner bamboo frame bar positioning grooves of the second side panel, two wedge-shaped notches respectively formed on the longitudinal frame bar portions near the transverse frame bar portion and engaged with the outer bamboo frame bar positioning grooves of the first side panel, and a plurality of vertical through holes respectively cut through the two longitudinal frame bar portions.

The bamboo rod members are connected between the first side panel and the second side panel, each bamboo rod member comprising two plug rods respectively extended from two distal ends thereof and respectively fitted into one respective plughole of the first side panel and one respective plughole of the second side panel, and at least one vertical through hole corresponding to the vertical through holes of the ⊓-shaped bamboo frame bar and the pinholes of the bottom panel.

The pins are respectively inserted through the vertical through holes of the bamboo rod members and the vertical through holes of the ⊓-shaped bamboo frame bar and fitted into the pinholes of the bottom panel.

Further, according to an alternate form of the present invention, two rectangular flat plate members are connected between the first side panel and the second side panel above the ⊓-shaped bamboo frame bar to substitute for the corresponding bamboo rod members. Each rectangular flat plate member comprises two tongues respectively protruded from two opposite short sides thereof and respectively engaged into a respective groove on the first side panel and a respective groove on the second side panel, and at least one through hole extending through two opposite long sides thereof for the passing of the pins.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
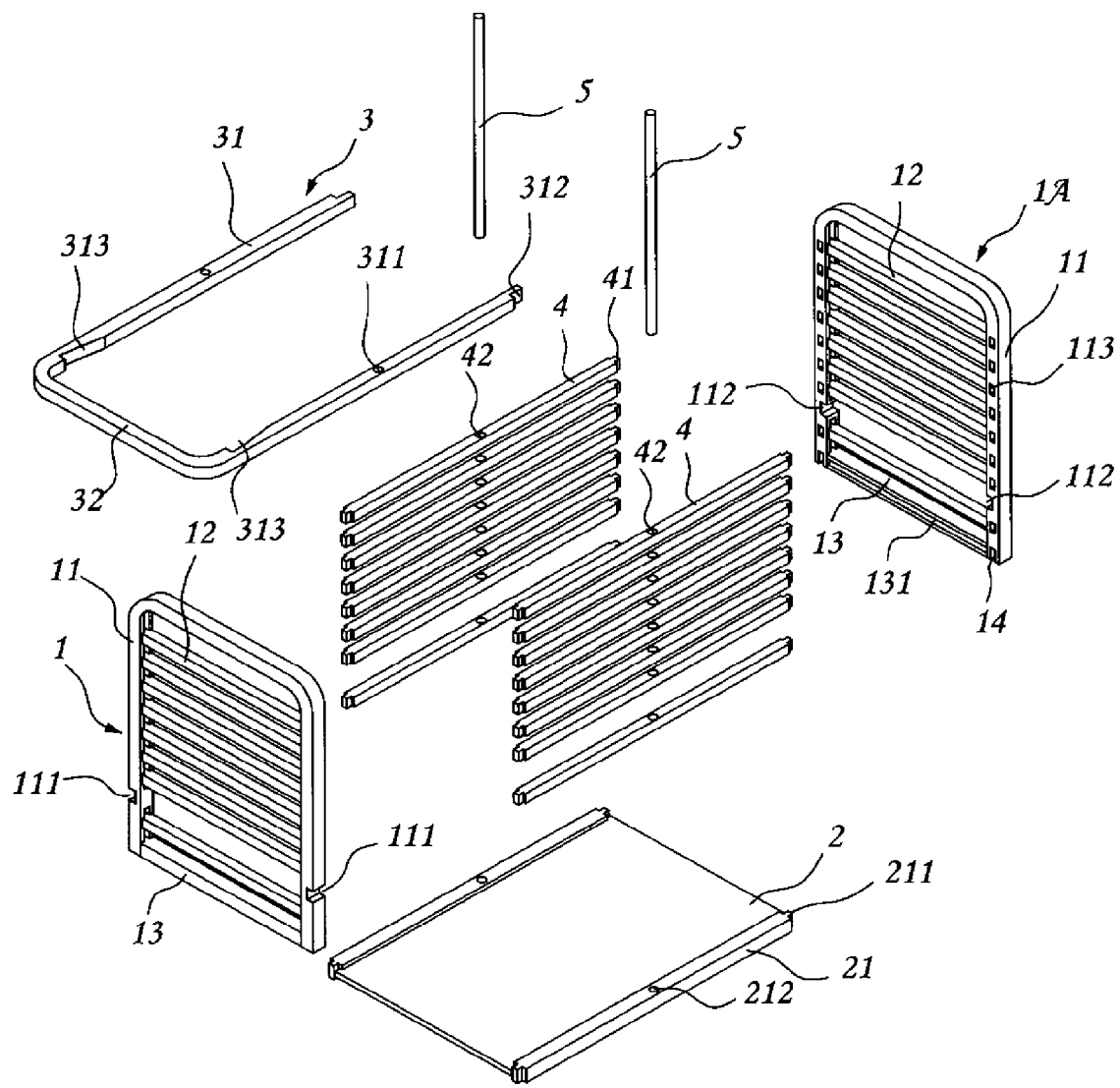
FIG. 1 is an exploded view of a detachable bamboo material-based storage container in accordance with a first embodiment of the present invention.

Referring to FIG. 1, a detachable bamboo material-based storage container in accordance with a first embodiment of the present invention is shown comprising a first side panel 1, a second side panel 1A, a bottom panel 2, a ⊓-shaped bamboo frame bar 3, a plurality of bamboo rod members 4 and a plurality of pins 5.

The first side panel 1 and the second side panel 1A each comprise a substantially rectangular open frame 11 made of bamboo, a plurality of transverse bamboo slats 12 transversely mounted in the rectangular open frame 11 at different elevations in a parallel manner. Further, the rectangular open frame 11 comprises a bottom rail 13 disposed in parallel to the transverse bamboo slats 12, a horizontal coupling groove 131 formed on one side of the bottom rail 13 and extending along the length of the bottom rail 13, a plurality of plugholes 113 bilaterally and symmetrically formed on an inner side of the respective side panel 1 or 1A at different elevations and arranged in two vertical lines, and two mortises 14 respectively formed the inner side of the respective side panel 1 or 1A in line with the two vertical lines of plugholes 113 and respectively disposed adjacent to the two distal ends of the bottom rail 13. The rectangular open frame 11 of the first side panel 1 further comprises two outer bamboo frame bar positioning grooves 111. The rectangular open frame 11 of the second side panel 1A further comprises two inner bamboo frame bar positioning grooves 112.

The bottom panel 2 is a substantially rectangular flat panel coupled with the two opposite short sides thereof to the horizontal coupling grooves 131 of the bottom rails 13 of the first side panel 1 and second side panel 1A, having two side bars 21 respectively arranged on the two opposite long sides thereof. Each side bar 21 has a tenon 21 extended from each of two distal ends thereof for engaging into the mortises 14 of the first side panel 1 or second side panel 1A, and a pinhole 212 on the middle for receiving one pin 5.

The ⊓-shaped bamboo frame bar 3 is formed by means of bending a straight bamboo rod frame bar into the desired shape, having two longitudinal frame bar portions 31, a transverse frame bar portion 32 connected between one end of each of the two longitudinal frame bar portions 31, two retaining tips 312 respectively extending from the distal end of each of the two longitudinal frame bar portions 31 remote from the transverse frame bar portion 32 for engagement with the inner bamboo frame bar positioning grooves 112 of the second side panel 1A, two wedge-shaped notches 313 respectively formed on the longitudinal frame bar portions 31 near the transverse frame bar portion 32 for engagement with the outer bamboo frame bar positioning grooves 111 of the first side panel 1, and two vertical through holes 311 respectively cut through the two longitudinal frame bar portions 31 for the passing of the pins 5.

Each bamboo rod member 4 has two plug rods 41 respectively extended from the two distal ends thereof for fitting into the plugholes 113 of the first side panel 1 and second side panel 1A, and a vertical through hole 42 cut therethrough corresponding to the vertical through holes 311 of the ⊓-shaped bamboo frame bar 3 and the pinholes 212 of the bottom panel 2 for the passing of the pins 5.

The pins 5 fit the diameter of the vertical through holes 42 of the bamboo rod members 4, the diameter of the vertical through holes 311 of the ⊓-shaped bamboo frame bar 3 and the diameter of the pinholes 212 of the bottom panel 2.

Figure 2:
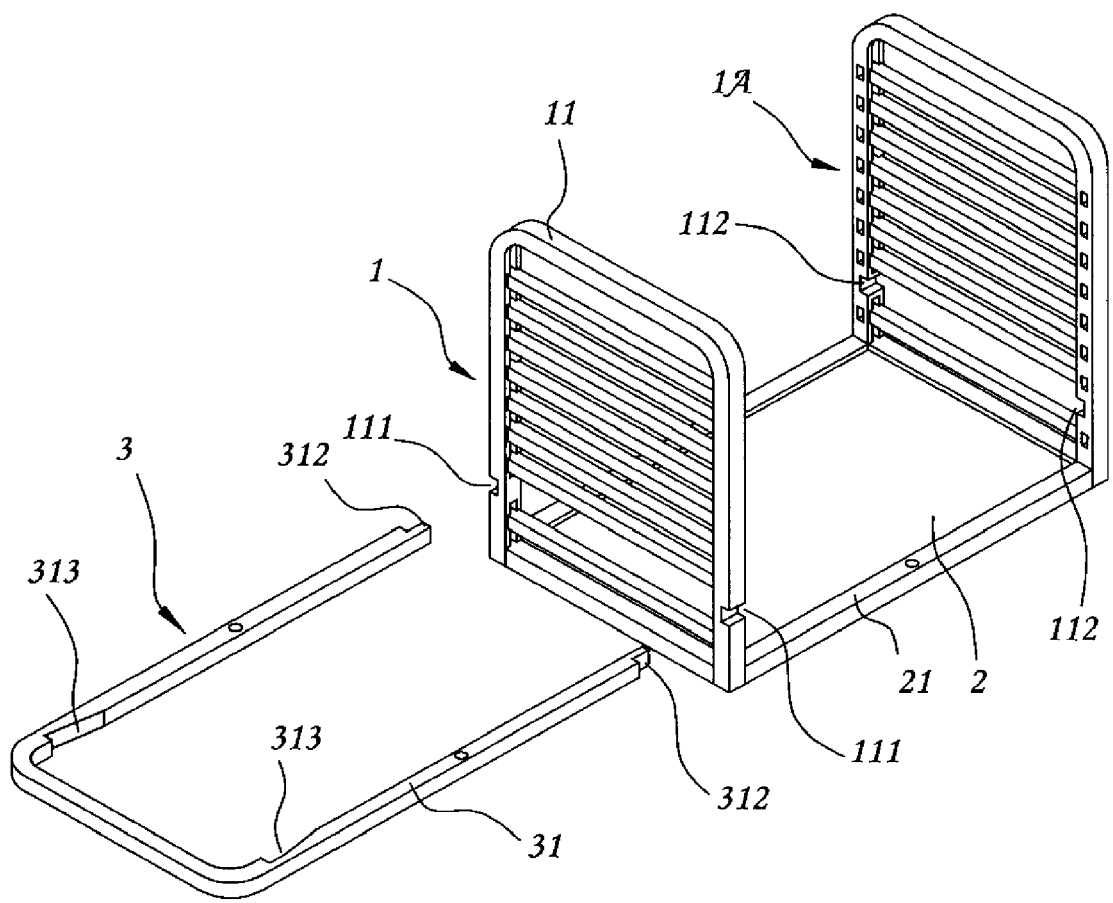
FIG. 2 is an assembly view of the detachable bamboo material-based storage container in accordance with the first embodiment of the present invention (I).
Figure 3:
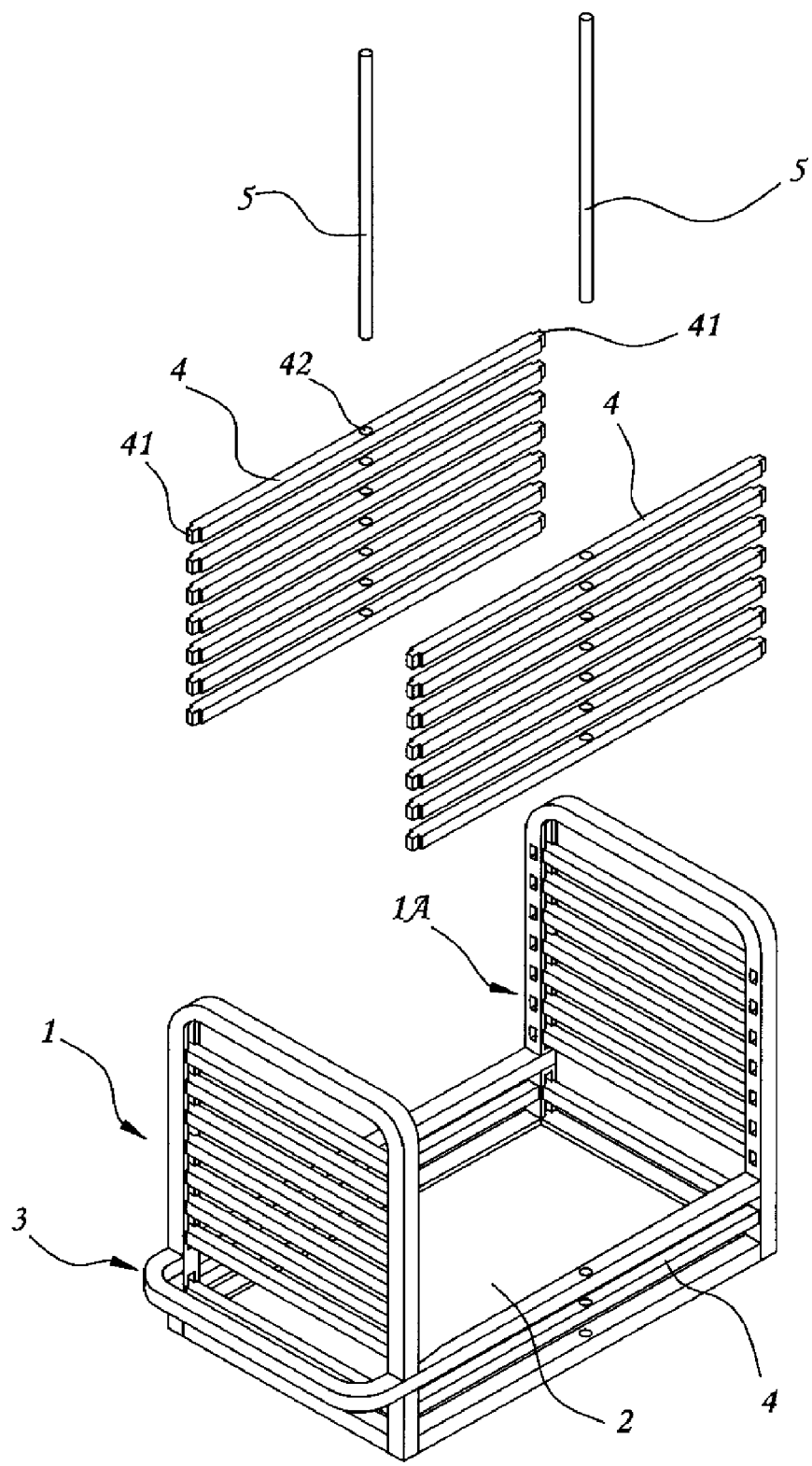
FIG. 3 is an assembly view of a part of the detachable bamboo material-based storage container in accordance with the first embodiment of the present invention (II).
Figure 4:
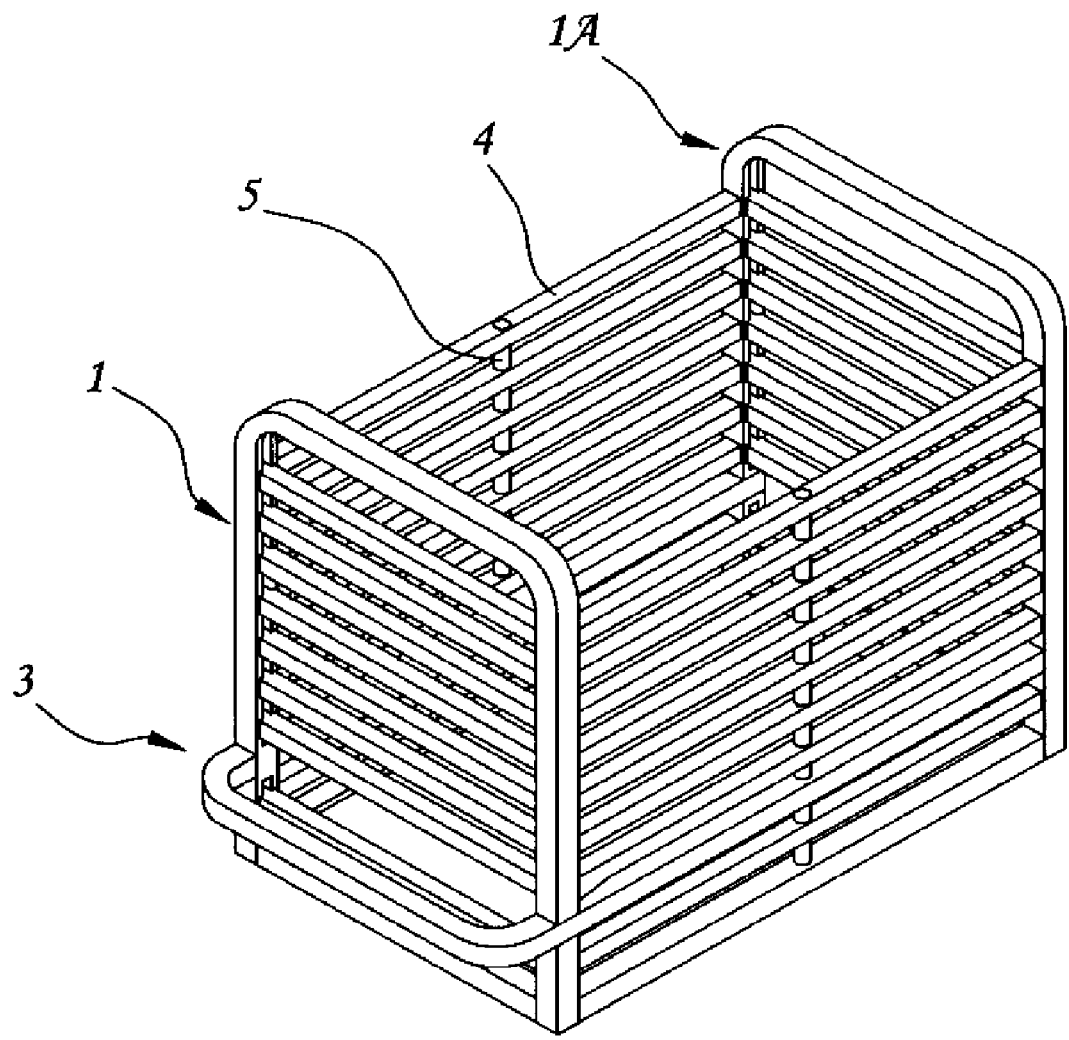
FIG. 4 is an elevational assembly view of the detachable bamboo material-based storage container in accordance with the first embodiment of the present invention.

The assembly process of the detachable bamboo material-based storage container is outlined hereinafter with reference to FIGS. 2~4 and FIG. 1 again. At first, the bottom panel 2 is attached with the two opposite short sides thereof to the horizontal coupling grooves 131 of the first side panel 1 and second side panel 1A to engage the tenons 21 into the mortises 14 of the first side panel 1 and second side panel 1A respectively (see FIG. 2), and then the two longitudinal frame bar portions 31 of the ⊓-shaped bamboo frame bar 3 are respectively inserted through the two outer bamboo frame bar positioning grooves 11 of the first side panel 1 to force the two wedge-shaped notches 313 into engagement with the outer bamboo frame bar positioning grooves 111 of the first side panel 1 and the two retaining tips 312 into engagement with the inner bamboo frame bar positioning grooves 112 of the second side panel 1A respectively (see FIG. 3), and then the bamboo rod members 4 are respectively connected between the first side panel 1 and the second side panel 1A at two sides at different elevations by means of plugging the respective plug rods 41 of the bamboo rod members 4 into the plugholes 113 of the first side panel 1 and second side panel 1A, and then the pins 5 are respectively inserted through the vertical through hole 42 of the bamboo rod members 4 and the vertical through holes 311 of the ⊓-shaped bamboo frame bar 3 and fitted into the pinholes 212 of the bottom panel 2 (see FIG. 4).

Figure 5:
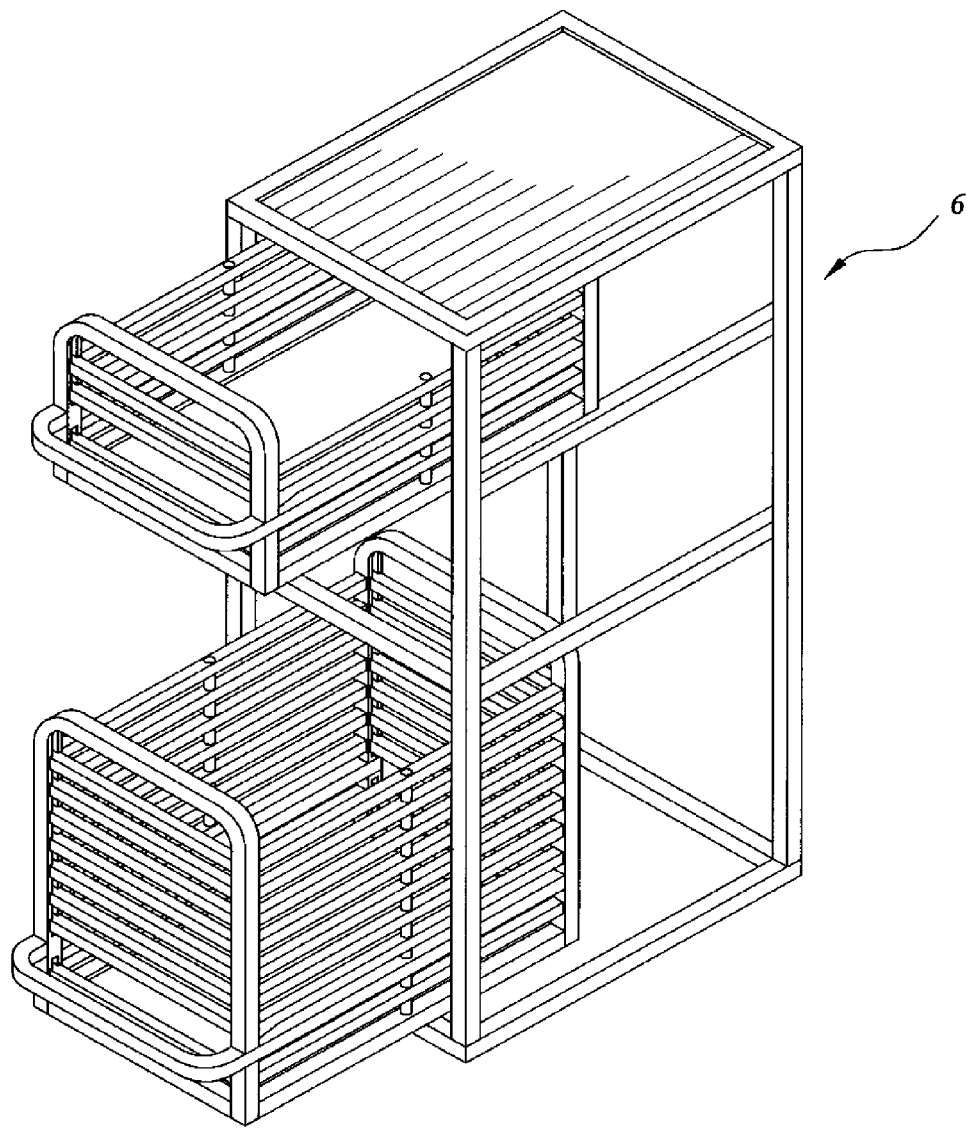
FIG. 5 is schematic drawing showing an application example of the detachable bamboo material-based storage container in accordance with the first embodiment of the present invention.

Referring to FIG. 5, different sides of detachable bamboo material-based storage containers made according to the present invention can be used as sliding boxes in a rack 6 for keeping things.

Figure 6:
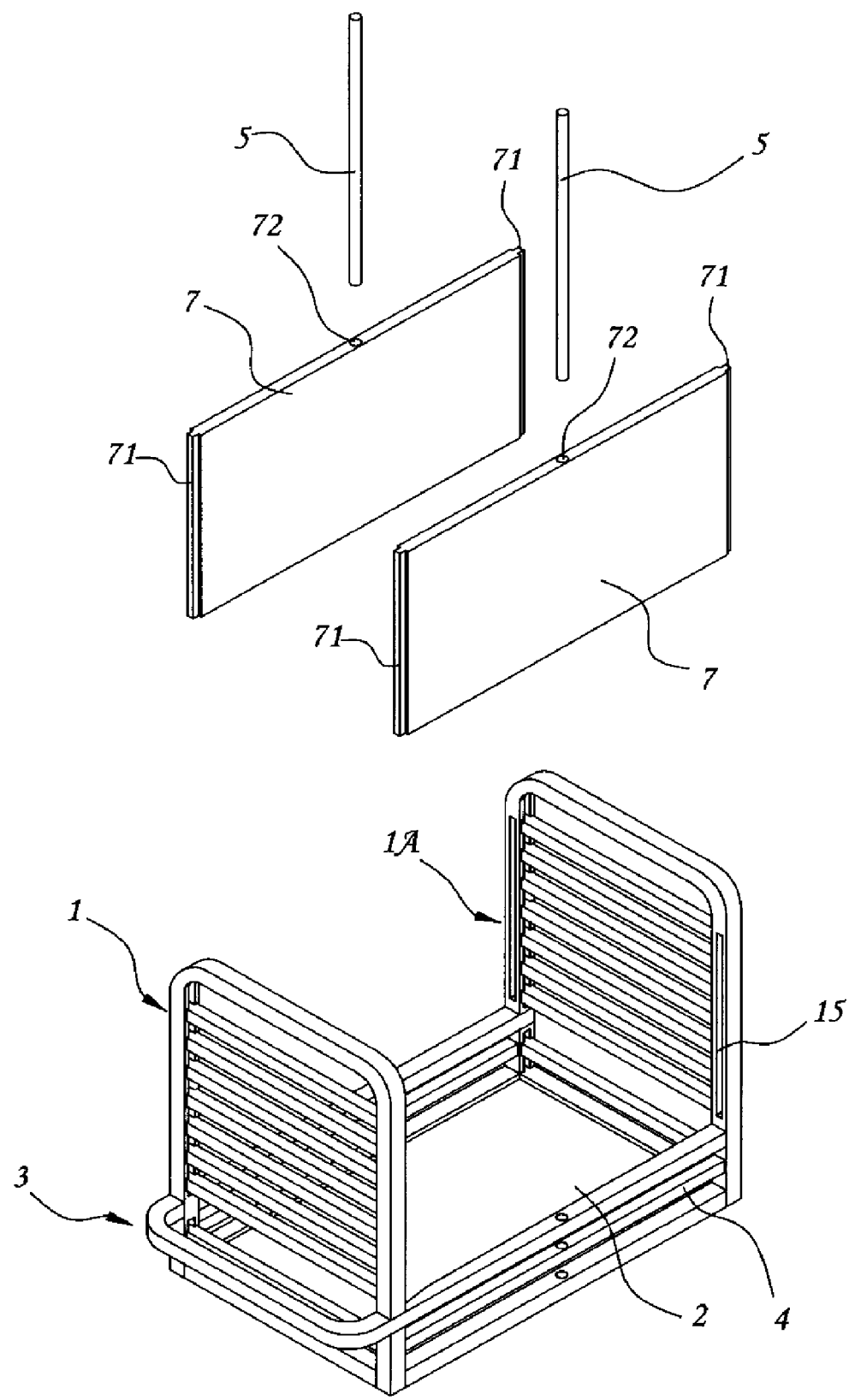
FIG. 6 is an exploded view of a detachable bamboo material-based storage container in accordance with a second embodiment of the present invention.
Figure 7:
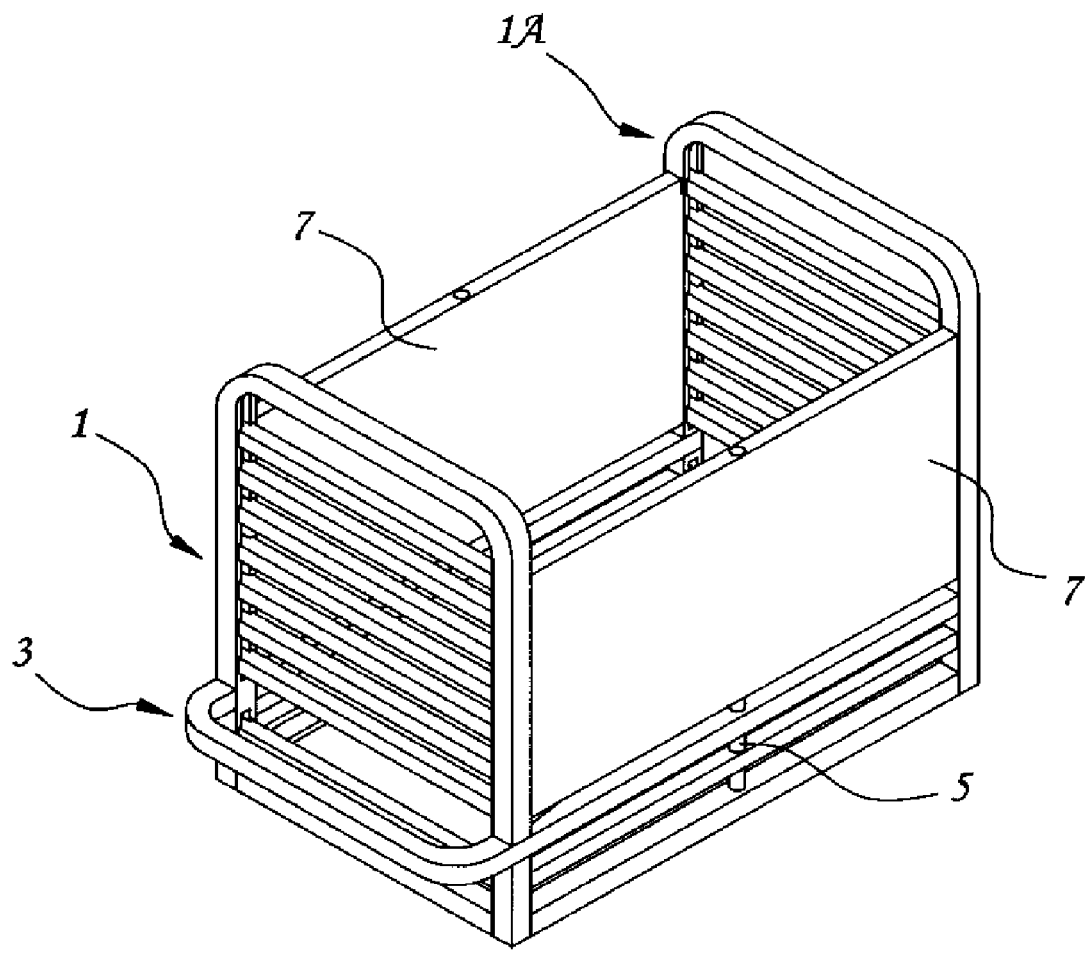
FIG. 7 is an elevational assembly view of the detachable bamboo material-based storage container in accordance with the second embodiment of the present invention.

FIGS. 6 and 7 show a detachable bamboo material-based storage container in accordance with a second embodiment of the present invention. This embodiment is substantially similar to the aforesaid first embodiment with the exception that this second embodiment uses two rectangular flat plate members 7 to substitute for the bamboo rod members 4 of the aforesaid first embodiment that are disposed above the ⊓-shaped bamboo frame bar 3. According to this second embodiment, each rectangular flat plate member 7 has two tongues 71 protruded from two opposite short sides thereof and respectively engaged into a respective groove 15 on each of the first side panel 1 and the second side panel 1A, and a through hole 72 extending through the two opposite long sides thereof for the passing of the pins 5.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A detachable bamboo material-based storage container, comprising:
    a first side panel, said first side panel comprising a substantially rectangular open frame made of bamboo, at least one bamboo slat transversely mounted in the rectangular open frame of said first side panel, a horizontal coupling groove formed on one side of a bottom rail of the rectangular open frame of said first side panel, a plurality of plugholes bilaterally and symmetrically formed on an inner side of the rectangular open frame of said first side panel, two mortises respectively formed on said inner side of said first side panel, and two outer bamboo frame bar positioning grooves formed on the rectangular open frame of said first side panel;
    a second side panel, said second side panel comprising a substantially rectangular open frame made of bamboo, at least one bamboo slat transversely mounted in the rectangular open frame of said second side panel, a horizontal coupling groove formed on one side of a bottom rail of the rectangular open frame of said second side panel, a plurality of plugholes bilaterally and symmetrically formed on an inner side of the rectangular open frame of said second side panel, two mortises respectively formed on said inner side of said second side panel, and two outer bamboo frame bar positioning grooves formed on the rectangular open frame of said second side panel;
    a bottom panel coupled to the horizontal coupling groove of the bottom rails of said first side panel and the horizontal coupling groove of the bottom rails of said second side panel, said bottom panel comprising two side bars respectively arranged on two opposite long sides thereof and a tenon respectively extended from each of two distal ends of said side bars and respectively engaging into the mortises of said first side panel and the mortises of said second side panel, and at least one pinhole on each of said side bars;
    a ⊓-shaped bamboo frame bar, said ⊓-shaped bamboo frame bar comprising two longitudinal frame bar portions respectively inserted through the outer bamboo frame bar positioning grooves formed on the rectangular open frame of said first side panel, a transverse frame bar portion connected between one end of each of said two longitudinal frame bar portions, two retaining tips respectively extending from a distal end of each of said two longitudinal frame bar portions remote from said transverse frame bar portion and respectively forced into engagement with the inner bamboo frame bar positioning grooves of said second side panel, two wedge-shaped notches respectively formed on said longitudinal frame bar portions near said transverse frame bar portion and engaged with the outer bamboo frame bar positioning grooves of said first side panel, and a plurality of vertical through holes respectively cut through said two longitudinal frame bar portions;
    a plurality of bamboo rod members connected between said first side panel and said second side panel, each said bamboo rod member comprising two plug rods respectively extended from two distal ends thereof and respectively fitted into one respective plughole of said first side panel and one respective plughole of said second side panel, and at least one vertical through hole corresponding to the vertical through holes of said ⊓-shaped bamboo frame bar and the pinholes of said bottom panel; and
    a plurality of pins respectively inserted through the vertical through holes of said bamboo rod members and the vertical through holes of said ⊓-shaped bamboo frame bar and fitted into the pinholes of said bottom panel.

2. The detachable bamboo material-based storage container as claimed in claim 1, further comprising two rectangular flat plate members connected between said first side panel and said second side panel above said ⊓-shaped bamboo frame bar, each said rectangular flat plate member comprising two tongues respectively protruded from two opposite short sides thereof and respectively engaged into a respective groove on said first side panel and a respective groove on said second side panel, and at least one through hole extending through two opposite long sides thereof for the passing of said pins.

* * * * *